United States Patent [19]

Posl et al.

[11] 3,760,251

[45] Sept. 18, 1973

[54] APPARATUS FOR CONTROLLING A PLURALITY OF INJECTION MOLDING MACHINES

[75] Inventors: Rudolf Posl; Burkard Popp, both of Nuremberg, Germany

[73] Assignee: Siemens Aktiengesellschaft, Munich, Germany

[22] Filed: June 12, 1972

[21] Appl. No.: 261,658

[30] Foreign Application Priority Data
June 14, 1971 Germany.................. P 21 29 419.9

[52] U.S. Cl............. 318/601, 318/562, 235/151.11
[51] Int. Cl. ........................................... G05b 11/32
[58] Field of Search.................... 318/562, 608, 571, 318/601; 340/172.5; 235/151.11

[56] References Cited
UNITED STATES PATENTS

| | | | |
|---|---|---|---|
| 3,465,298 | 9/1969 | Duke et al. ...................... | 318/571 X |
| 3,172,026 | 3/1965 | Schuman ........................... | 318/601 |
| 3,641,326 | 2/1972 | Harte................................. | 318/562 |
| 3,626,385 | 12/1971 | Bouman........................... | 318/562 X |
| 3,372,568 | 3/1968 | Lemelson......................... | 318/562 X |

*Primary Examiner*—B. Dobeck
*Attorney*—Hugh A. Chapin

[57] ABSTRACT

An apparatus for controlling a plurality of injection molding machines is disclosed wherein each injection molding machine is provided with a digital memory. The memories are provided with data from a central unit and are activated as a function of travel of appropriate machine parts of the respective molding machines.

6 Claims, 2 Drawing Figures

APPARATUS FOR CONTROLLING A PLURALITY OF INJECTION MOLDING MACHINES

BACKGROUND OF THE INVENTION

The invention relates to an apparatus for controlling a plurality of injection molding machines such as those for molding plastic. More particularly, the invention relates to such an apparatus having a central unit for providing data to a plurality of digital memories, each memory being associated with its respective molding machine.

When automating an injection molding machine, once the operating parameters or measured values have been empirically determined, it is a special problem to have these parameters or values available at any time in a reproducible manner for the control of the machine. Such parameters and operating values include machine travel at which some operating command is to be transmitted, or times, pressures and temperatures.

A solution to this problem has already been suggested for an injection molding machine equipped with a device for storing measured values and operational quantities wherein the operational quantities are inserted through a logic circuit into storage locations of a digital memory and recalled from this memory by commands such as definite position values derived from the machine for controlling the same. The digital memory is built up with integrated circuits and the operational quantities are temperature, pressure or measured values, especially travel signals in dependence upon the position of a functional-mode selection switch. In connection with this solution, reference may be had to Swiss Pat. No. 486,940.

The current trend of automation requires that several injection molding machines be combined and simultaneously controlled from a central location. This poses the limiting condition on the one hand, that the central unit should not be overloaded with tasks with the consequence that it is necessary to resort to a costly, large process computer having a large cycle time, and on the other hand, it is desirable that the control unit connected to each machine be relatively simple but nevertheless flexible.

SUMMARY OF THE INVENTION

It is an object of the invention to provide an apparatus for controlling a plurality of injection molding machines which substantially fulfills the above-stated requirements. Subsidiary to this object, it is an object of the invention to provide such an apparatus wherein a multiplicity of commands are transmitted in a relatively simple manner to each of the injection molding machines at the required time.

According to a feature of the invention, a plurality of injection molding machines are each provided with a freely programmable digital storage memory which is in turn connected with a central unit from which commands can be transferred to the memory. Each command is assigned a position address corresponding to a desired position of a machine part of the corresponding machine. Each machine has digital positioning devices for the machine parts to be positioned. Each memory is connected with a comparison unit to which also the respective position measuring devices are connected. All position addresses of each memory can be continuously and successively compared with the actual position value fed to the comparison unit, and in the event of coincidence, the corresponding stored command can be called up from the memory for controlling the respective machine.

In this manner, a relatively simple and flexible control for a plurality of machines can be achieved, by means of which any desired, freely selectable number of commands can be called up, for example, at a desired position location of a machine part.

A particularly simple interrogation of the position addresses in the storage memory is obtained if their sequence in time is controlled by a command counter which is connected to a timing unit because, for this condition, transmission of the stored commands is possible via a distributor which is controlled by this command counter. Since several position measuring devices can be associated with each memory, it is further advantageous to make the subdivision of the position addresses in time so that, according to a given count of the command counter, only one predetermined position measuring system is connected to the comparison unit.

The above-mentioned digital memory can be designed advantageously from integrated circuits, because a relatively simple, space-saving and inexpensive storage of the required data is obtained thereby; however, in lieu of such a storage system, it is also possible to build a memory with shift registers or magnetic cores.

The apparatus according to the invention is advantageous if the flow of information goes not only from the central unit via the memory to the individual machines, but also if the position values obtained in setting up the machine, at which any switching actions or commands are to be executed, can be fed back from the position measuring device via the memory to the central unit. At the central unit, these commands are then stored in a suitable manner, for example, on punch cards or perforated tape. The central unit can comprise, for example, a perforated-tape reader which reads the required program and transmits it to the individual storage devices. Alternatively, the central unit is part of a larger computer which takes care of higher-order disposition problems.

Although the invention is illustrated and described herein as an apparatus for controlling a plurality of injection molding machines, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
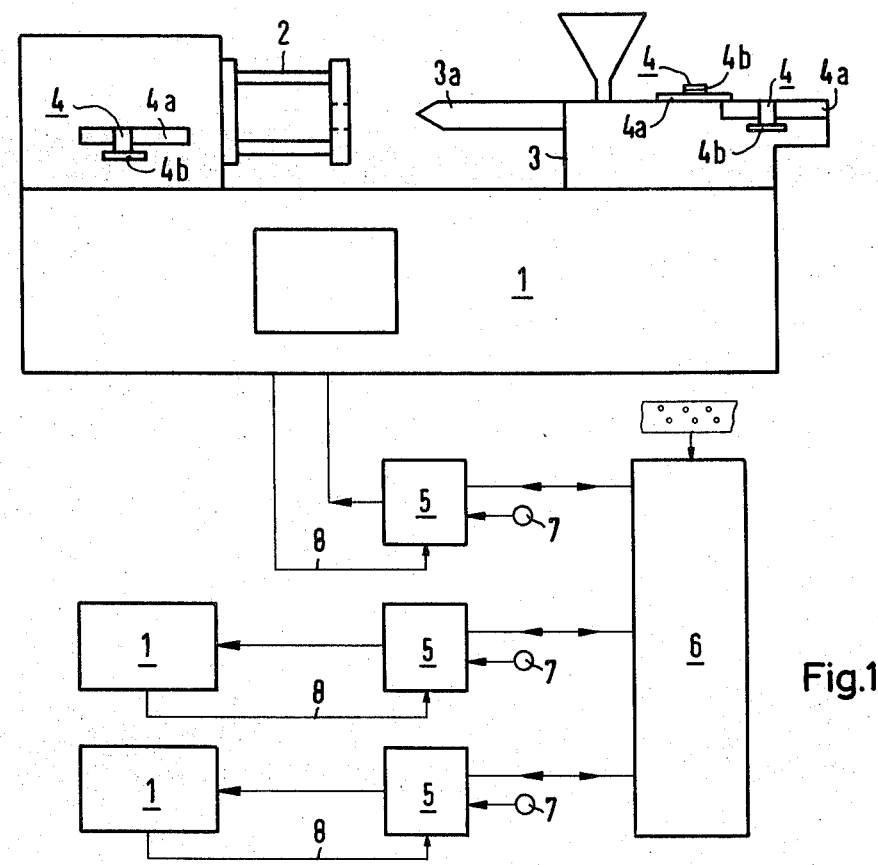
FIG. 1 is a block diagram showing the disposition of the central unit and evaluation devices of the machine control apparatus according to the invention.
Figure 2:
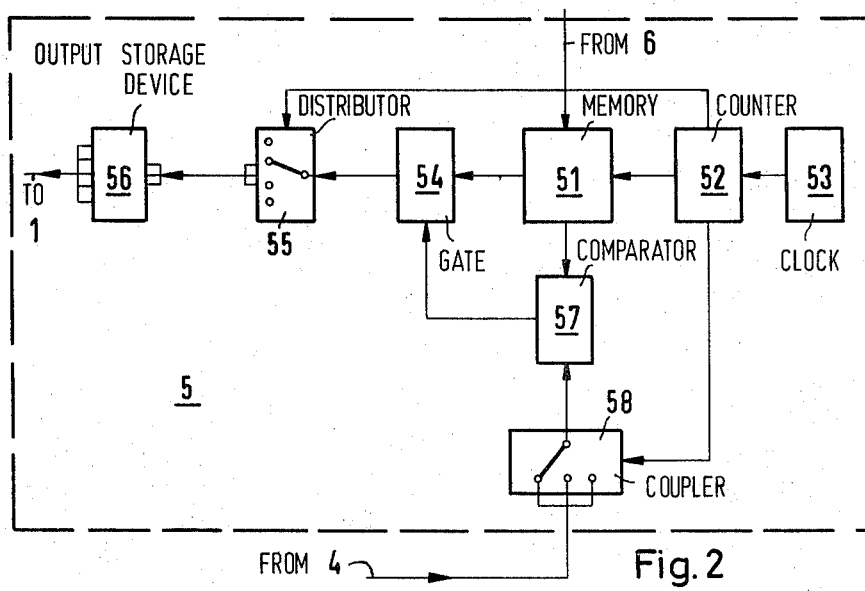
FIG. 2 is a detail block diagram showing the components of an evaluation device.

Referring to FIG. 1, each of the injection molding machines 1 is provided with an evaluation device 5 which in turn is connected to a central unit 6. Appropriate commands are transmitted from the central unit 6 to the evaluation device 5 which comprises storage and control units. These commands can be additionally altered manually by means of decade switched 7.

Each injection molding machine 1 is provided with digital position measuring devices for the machine parts to be controlled. The actual position values are taken from the respective measuring devices and fed via line 8 to the evaluation device 5 for the issuance of commands in dependence upon the position values.

In the illustrated embodiment, three position measuring devices 4 are shown for respectively measuring the position of the injection slide 2, the assembly 3 and the mold-closing part 3a of the injection molding machine 1. Each of the measuring devices 4 consists of a magnetic digital absolute scale 4a and a fixed contactless, switchless pickup unit 4b. The pickup unit 4b can be a Hall generator for example. The individual position measuring systems 4 are arranged here in each case parallel to the direction of displacement of the appropriate machine part.

The evaluation device 5 contains a digital memory 51 made up of integrated circuits. Commands from the central unit 6 in the form of the distances to be travelled and other operational data, such as temperature and pressure can be read into the memory 51. To each of the commands is assigned a position address which agrees with some actual position value which can be ascertained by the position measuring devices 4.

A clock 53 continuously triggers a command counter 52 and, in dependence upon the position of the counter, one of the position addresses in the memory 51 is always fed to the comparator 57. The position values determined by the position measuring system 4 are in each instance supplied to the comparator 57 through coupling means in the form of a measuring system coupler 58. If the actual position value just measured agrees with the storage address fed in at the time, the gate 54 is opened and the corresponding command in the memory 51 is fed via the command distributor 55, to the corresponding command stage in the output storage device 56 and transmitted to the machine control. The distributor 55 is also advanced synchronously by the counter 52.

Since there are several position measuring devices 4 that provide several actual values of position simultaneously, the measuring system coupler 58 selectively connects the position measuring devices to the comparator 57 at respective intervals consisting of a predetermined number of cycles. The coupler 58 is also controlled by the counter 52.

The organization of the position addresses in the memory 51 is arranged here so that, for example, with 64 possible addresses, forty addresses are assigned to the first measuring system, twenty addresses to the second measuring system and four addresses to the third measuring system; this ensures that the measuring system coupler 58 is switched over at the respective corresponding counter positions. The special feature of the storage device is that the individual position addresses of the memory 51 are continuously and successively scanned to determine whether one of these addresses corresponds to any one of the actual position values just delivered. Thus, far greater flexibility and variation of control possibilities are obtained than with control arrangements known up to the present time.

Digital absolute scales are well known (see Control Engineering Nov. 1956, page 107–113). The code may be represented by openings (optical system) or by magnetic signs as it is here.

What is claimed is:

1. Apparatus for controlling a plurality of injection molding machines such as those used for molding plastic, each of the machines having movable parts which move in response to predetermined commands, said apparatus comprising: a central unit for storing and issuing commands for operating the respective machines; and a plurality of evaluation devices respectively connected to said central unit and corresponding to respective ones of the molding machines, each one of said evaluation devices comprising a programmable digital memory connected to said central unit for receiving commands therefrom for operating the machine corresponding to said one device, each one of said last-mentioned commands including a position address corresponding to a position quantity for a movable part of the machine; digital position measuring devices mounted relative to the movable parts respectively of the machine for providing actual values of the respective positions of the parts; a comparator; and coupling means connected to said position measuring devices for selectively supplying actual position values to said comparator, said comparator being connected to said digital memory for continuously comparing all of said position addresses of said memory sequentially with the actual position value supplied by said coupling means at a given time and for providing a signal for releasing an appropriate command from said digital memory for controlling the machine corresponding to said one evaluation device when a position address is coincident with said last-mentioned actual position value.

2. The apparatus of claim 1 wherein said evaluation device comprises a command counter connected to said digital memory for controlling the time sequence of said position addresses for making the comparison in said comparator, and a clock connected to said command counter for continuously triggering the same.

3. The apparatus of claim 2 wherein said evaluation device comprises a command distributor for receiving and transmitting said command issued in response to said signal, said command counter being connected to said command distributor for synchronously controlling the same.

4. The apparatus of claim 2 wherein said command counter is connected to said coupling means for connecting said position measuring devices individually to said comparator in dependence upon the position of said counter.

5. The apparatus of claim 1, said memory consisting of integrated circuits.

6. The apparatus of claim 1, each of said position measuring devices comprising a digital, absolute, magnetic code scale.

* * * * *